United States Patent
Kobayashi

[11] Patent Number: 6,056,077
[45] Date of Patent: May 2, 2000

[54] SMALL VEHICLE

[75] Inventor: Takashi Kobayashi, Iwata, Japan

[73] Assignee: Yamaha Hatsudoki Kabushiki Kaisha, Iwata, Japan

[21] Appl. No.: 08/967,159

[22] Filed: Nov. 10, 1997

[30] Foreign Application Priority Data

Nov. 20, 1996 [JP] Japan .................................. 8-309604
Oct. 17, 1997 [JP] Japan .................................. 9-285708

[51] Int. Cl.$^7$ ...................................................... B60K 9/00
[52] U.S. Cl. ........................ 180/216; 180/311; 180/908; 180/65.1; 280/124.111; 280/786
[58] Field of Search ................................. 180/311, 312, 180/907, 908, 65.1, 295, 299, 68.5, 65.5, 216; 280/267, 269, 281.1, 282, 786, 788, 798, 124.113, 124.116, 124.111

[56] References Cited

U.S. PATENT DOCUMENTS

| 4,352,509 | 10/1982 | Paton et al. ...................... 280/124.116 |
| 4,405,027 | 9/1983 | Enokimoto et al. .................... 180/312 |
| 4,798,255 | 1/1989 | Wu .................................... 280/124.113 |
| 4,946,189 | 8/1990 | Manning .......................... 280/124.116 |
| 4,946,193 | 8/1990 | Oka ......................................... 180/907 |
| 5,312,126 | 5/1994 | Shortt . | 
| 5,397,145 | 3/1995 | Kobluk . |
| 5,476,276 | 12/1995 | Hurlburt ............................ 280/124.113 |
| 5,575,352 | 11/1996 | Suzuki et al. ............................ 180/311 |
| 5,740,878 | 4/1998 | Sala ......................................... 180/312 |
| 5,762,155 | 6/1998 | Scheulderman ........................ 180/65.1 |

FOREIGN PATENT DOCUMENTS 0636536  2/1995  European Pat. Off. .

OTHER PUBLICATIONS

European Search Report dated Feb. 26, 1998.

Primary Examiner—Paul N. Dickson
Assistant Examiner—Lynda Jasmin
Attorney, Agent, or Firm—Knobbe, Martens, Olson & Bear LLP

[57] ABSTRACT

Several embodiments of small vehicles having a relatively narrow body frame assembly supporting front and rear wheels at its ends through suspension systems. A single seat is carried by an upwardly extending rearward portion of the body frame assembly. The body frame assembly is narrow so that a person can stand beside the seat and lower himself into it without having to climb into the vehicle. Various battery arrangements are disclosed all of which have the batteries disposed so that they are inserted and removed in a generally horizontal direction to minimize the degree of lifting required for replacement and insertion.

57 Claims, 12 Drawing Sheets

SMALL VEHICLE

BACKGROUND OF THE INVENTION

This invention relates to a small vehicle and more particularly to an improved type of small, single passenger vehicle that is used by physically challenged individuals.

There is a type of four-wheel vehicle that is commonly used by individuals that have physical disabilities that make it difficult for them to walk long distances. Basically this type of vehicle is powered by an electric motor which, in turn, receives energy from one or more storage batteries carried on the vehicle.

With this type of vehicle, it is desirable to ensure that the vehicle has at least four wheels and those four wheels are relatively widely spaced. That is, the tread of the front and back wheels is maintained fairly large so as to maintain stability for the vehicle.

Because of the nature of the user, it is desirable if the seat of the vehicle is positioned in an area that the rider can move to a position close to the seat in a standing condition and then sit in the seat rather than having to climb into the vehicle to become seated. Vehicles of this type that have been previously proposed, however, have not lent themselves to this type of entry, for a variety of reasons.

One of the reasons is that the battery storage for the vehicle normally takes up a fairly wide area and requires a rather strong structure to support the weight of the batteries. The batteries may be carried by the frame in proximity to the seat and thus, the frame and/ or body tends to become widened in the area of the seat. This widening of the frame in the seat area makes it difficult for the occupant to enter the vehicle by merely sitting in the seat and then swinging his legs into position.

It is, therefore, a principal object of this invention to provide an improved small vehicle that facilitates entry, particularly by physically challenged persons.

Even though it is desirable to maintain a relatively narrow area in the proximity to the seat, the vehicle structure should be such that the occupant, when seated, can place his feet in a fairly widely spread position so as to afford stability and security. As has been noted, this can be achieved with the prior art type of devices but when this is done, entry is made difficult.

It is, therefore, a still further object of this invention to provide an improved small vehicle construction wherein the rider may conveniently sit with his feet in a widely spaced position but nevertheless can approach the vehicle close to the seat so that he can enter it by merely seating himself on the seat.

As has been noted, this type of vehicle is normally powered by an electric motor and electric batteries. Obviously, the battery should be rechargeable to facilitate life and reduce expense. The previous type mounting arrangements for the batteries have mounted the batteries in a generally vertical position and this requires a fairly large frame assembly and mounting arrangement for holding the batteries. Also, this means that to charge the batteries, the vehicle must be moved to proximity with the battery charger. This is not always feasible or desirable. However, the weight of the batteries and their positioning and prior art type constructions has made it difficult for the user to remove the batteries and move them to a remote location for charging.

It is, therefore, a still further object of this invention to provide an improved electrically powered small vehicle wherein the batteries are mounted in such a way that they can be easily removed and installed without the operator having to bend to pick them up or lift them from a low position.

In order to facilitate the utilization and removal of batteries, it may be desirable to provide several battery packs each of which can be removed and installed separately. Of course, this generally decreases the useable area of the vehicle. At times, however, it is desirable if the vehicle can provide a storage compartment that can be sealed or locked and which contain personal articles.

It is, therefore, a still further object of this invention to provide an improved small vehicle having battery carriers and at least one of which can serve as a storage compartment for objects other than batteries if desired.

It should be readily apparent from the foregoing description that it is desirable to provide a vehicle of this type that will have a relatively narrow body frame and assembly, particularly in the vicinity of the seat so as to permit the rider to enter the seat by merely standing beside it and sitting in position. However, it is also desirable to provide some form of suspension system for the vehicle upon its wheels so that the ride will be smooth and stable. This means that the suspension systems previously employed have required relatively large and wide frames and thus have made the access to the vehicle more difficult.

Alternatively the wheels have not been mounted for suspension movement relative to the frame. This obviously results in a harsh ride and possible loss of stability.

It is, therefore, yet another object of this invention to provide an improved wheel suspension system for a small vehicle and frame arrangement wherein the frame can be narrow in the area adjacent the rider's seat but the vehicle will have good suspension and stability.

SUMMARY OF THE INVENTION

Several of the features of the invention are adapted to be embodied in a small, fourwheel vehicle comprised of a body frame assembly. A pair of front wheels are supported by a first suspension system at a forward part of the body frame assembly with the front wheels being spaced transversely outwardly from the sides of the front body frame assembly portion. A pair of rear wheels are supported by a second suspension system at the rearward portion of the body frame assembly and also extend transversely outwardly beyond the body frame assembly. The body frame assembly forward portion extends from the area between the front wheels generally horizontally and rearwardly. At a point between the axes of the front and rear wheels, the forward portion is joined to a rearward portion which extends upwardly and rearwardly and which terminates in the area adjacent and between the rear wheels. A seat is carried by this rearward frame portion in an elevated position relative to the forward frame portion.

In accordance with a first feature of the invention, the body frame assembly is not substantially wider than the width of the seat, at least in the area between the front and rear wheels, so that a person may enter the seat from a standing position closely adjacent the seat by merely sitting on the seat.

In accordance with another feature of the invention, a battery is slidably supported beneath the rearward body frame portion in an area where the battery assembly can be removed and inserted in a generally horizontal direction.

In accordance with a further feature of the invention, at least one of the suspension systems provides a pivotal connection to the body frame assembly that is disposed substantially inwardly from the transverse position between the suspended wheels.

In accordance with yet another feature of the invention, the wheels are supported by a common beam axle that is pivotally mounted at an intermediate portion on the body frame assembly by resilient means that permit pivotal movement of the beam and vertical movement of the beam relative to the body frame assembly.

In accordance with yet a further feature of the invention, the suspension system for the pair of wheels comprises a suspension arm that is formed from a pair of diverging sides that are pivotally connected adjacent their closest ends at the mid point of the frame and which extend outwardly therefrom toward the suspended wheels so as to minimize the width of the vehicle in the area of the seat and still provide a long arm.

In accordance with a still further feature of the invention, the vehicle is powered by an electric motor and a pair of battery carriers are positioned each of which has a socket therein for providing an electrical connection with the battery when installed. At least one of these battery compartments can be closed and also as useable as a storage area.

DETAILED DESCRIPTION OF THE PREFERRED EMBODIMENTS OF THE INVENTION

Figure 1:
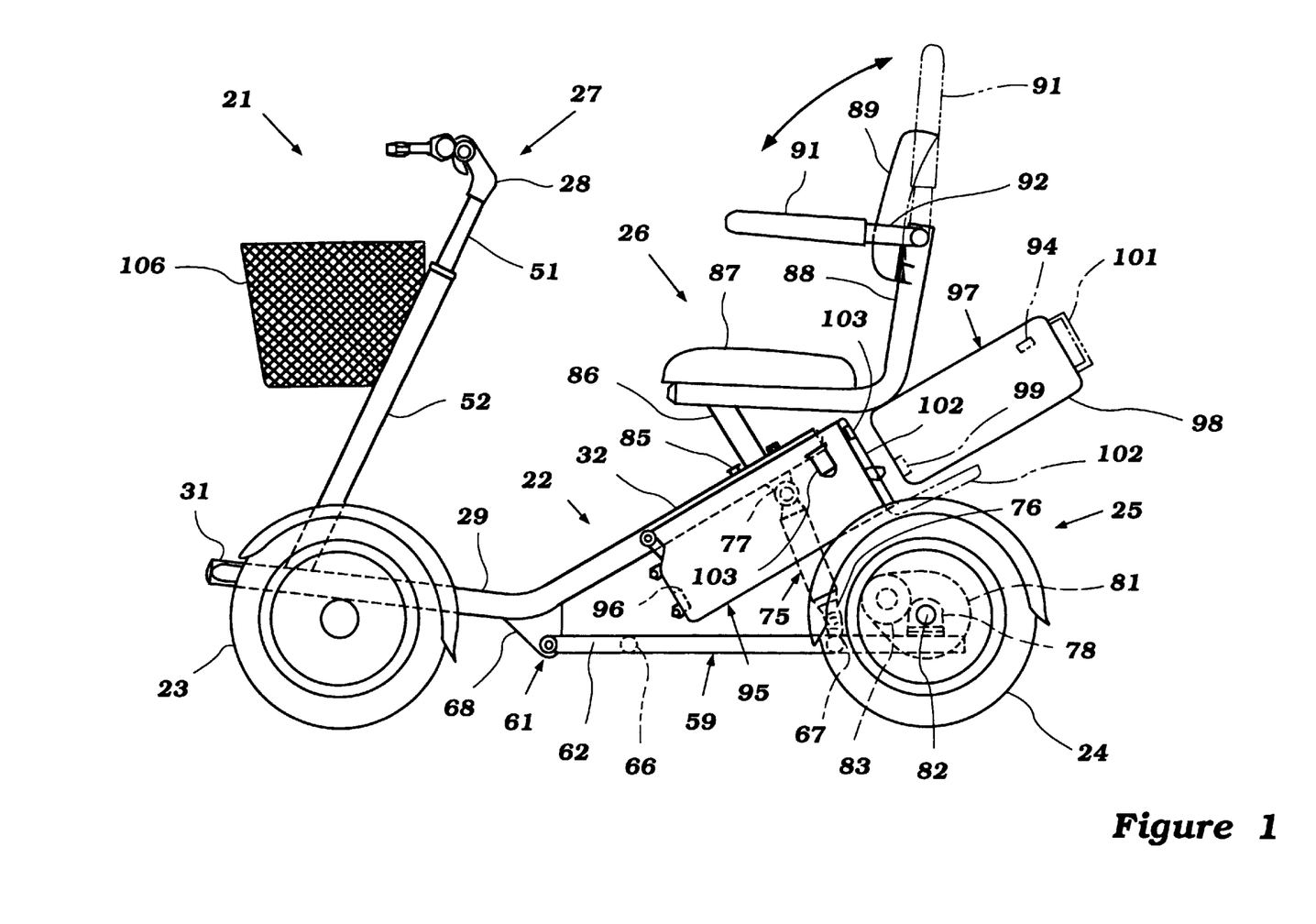
FIG. 1 is a side elevational view of a small vehicle constructed in accordance with a first embodiment of the invention, showing the arm rest in its normal riding position in solid lines and in the position for facilitating access to the seat in phantom lines and also showing the battery installed in solid lines and in its withdrawn position in phantom lines.
Figure 2:
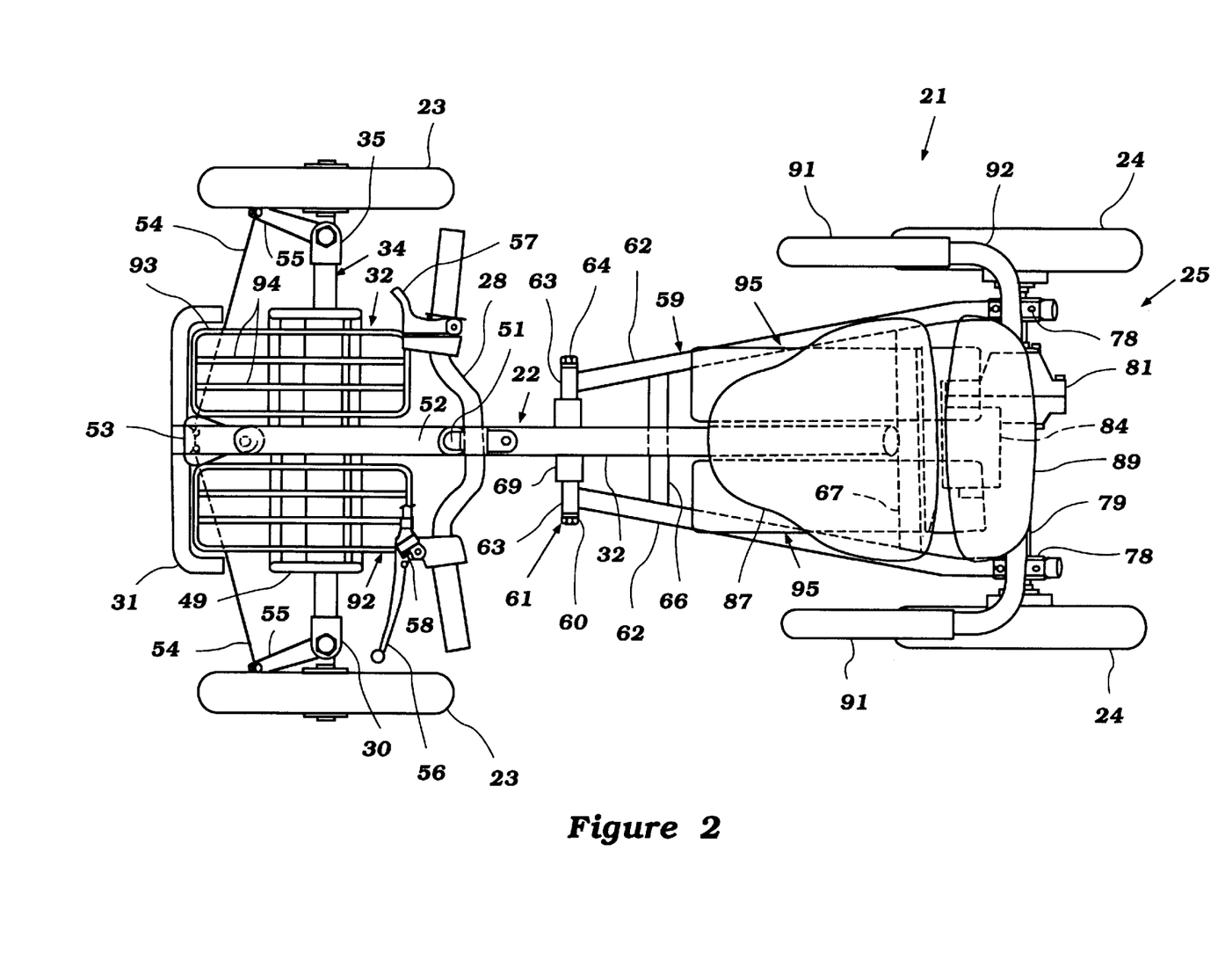
FIG. 2 is a top plan view of the vehicle of this embodiment.

Referring now in detail to the drawings and initially to the embodiment of FIGS. 1–5, a small vehicle constructed in accordance with this embodiment is identified generally by the reference numeral 21. Referring initially primarily to FIGS. 1 and 2, the vehicle 21 includes a body frame assembly, indicated generally by the reference numeral 22. This body frame assembly 22 is suspended by means of a front suspension system, shown in most detail in FIGS. 3 and 4 on a pair of front wheels 23. The rear portion of the frame assembly 22 is supported on a pair of rear wheels 24 by a rear suspension assembly, indicated generally by the reference numeral 25 and which is shown in most detail in FIG. 5 in addition to these figures.

A seat assembly, indicated generally by the reference numeral 26 is adjustably carried by the frame assembly 22 in proximity to the rear wheels 24 in a manner which will be described. A rider seated on this seat 26 can control the vehicle 21 by a control assembly, indicated generally by the reference numeral 27, and which includes a handlebar assembly 28 for steering purposes and throttle and brake controls, as will be described in more detail later.

The body frame assembly 22 in this embodiment is comprises primarily of a backbone type tubular frame. This consists primarily of a singular tubular member formed from steel or any other high strength light weight material. This tubular member 22 has a forward portion 29 that extends rearwardly from a front bumper part 31 that is also formed as a metal tube with a rubberized coating.

The frame portion 29 terminates just slightly forwardly of the front of the rear wheels 24 at a point between the front and rear wheels 23 and 24 but closer to the former. At this point, the tube bends upwardly to an extending portion 32 which, in turn, extends upwardly and rearwardly. The portion 32 terminates rearwardly of the front of the rear wheels 24 but forwardly of their rotational axis.

Because of this construction of the frame assembly 22, there is a wide area left open between the front and rear wheels 23 and 24 and in proximity to the seat 26. The advantages and results of this construction will be described in more detail later.

Figure 3:
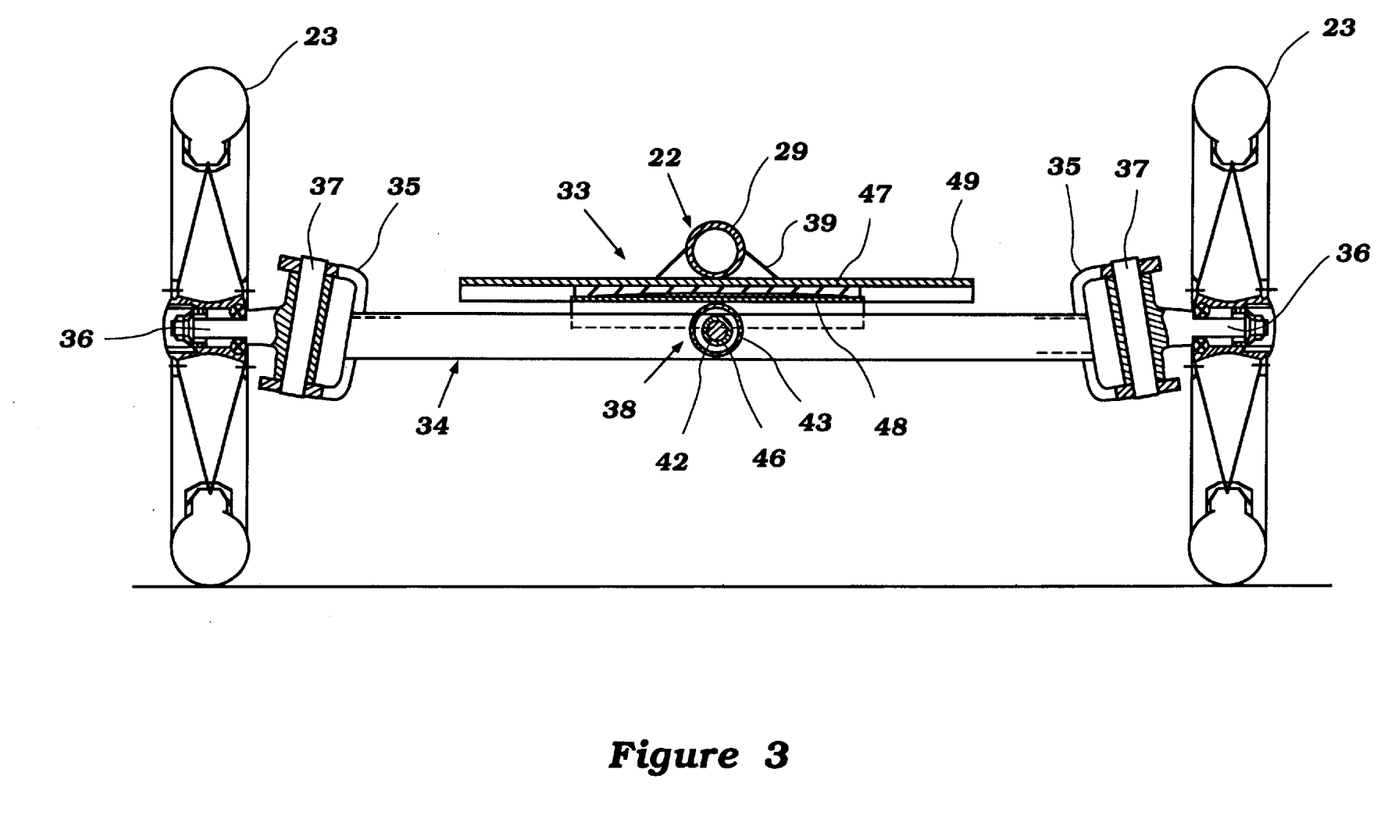
FIG. 3 is an enlarged scale, partial cross-sectional view, showing the front suspension system.
Figure 4:
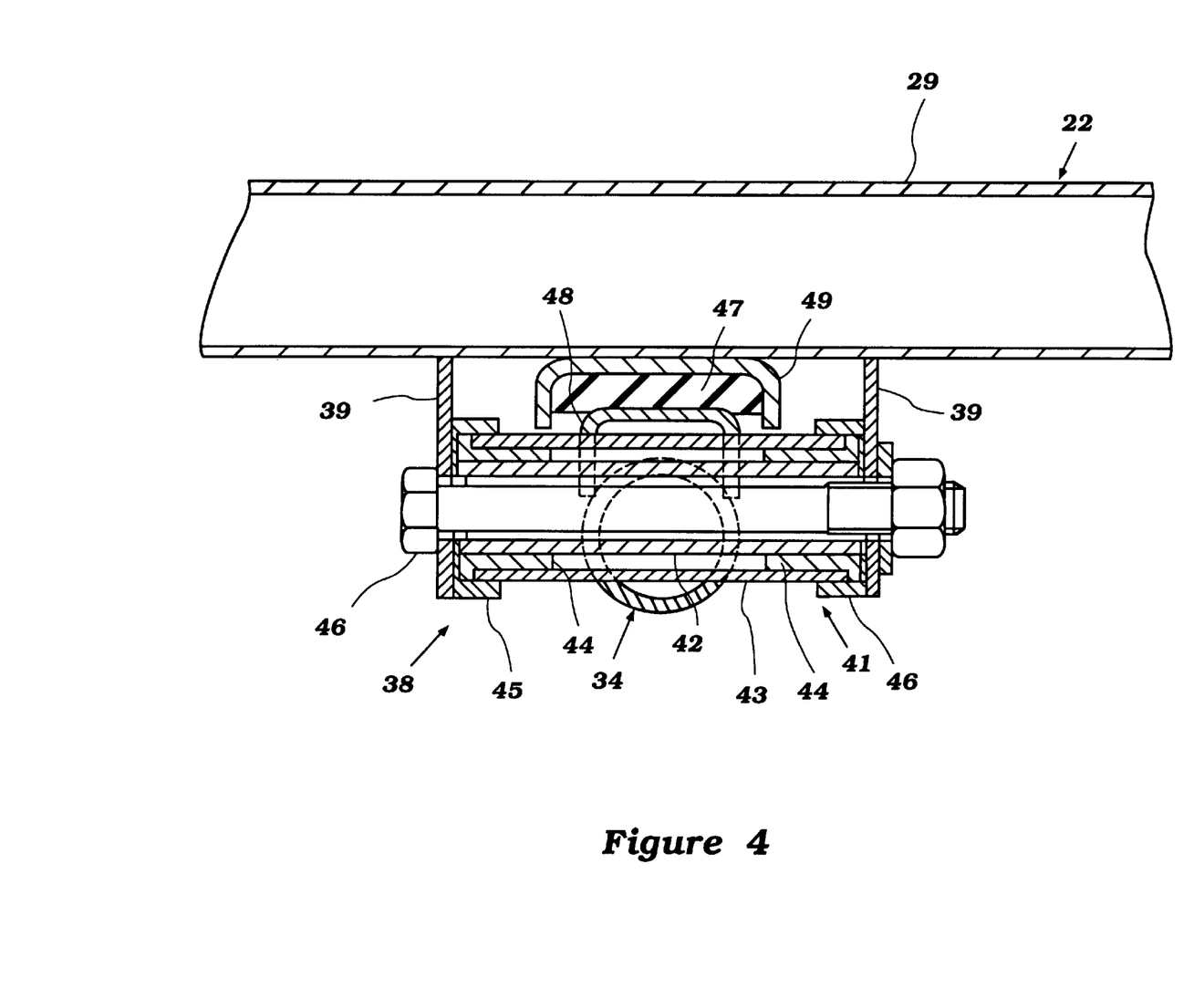
FIG. 4 is a enlarged cross-sectional view taken along a plane perpendicular to the plane of FIG. 3 and shows further details of the front suspension system.

Referring primarily to FIGS. 3 and 4 in addition to FIG. 2, the front wheel suspension is identified generally by the reference numeral 33 and includes a tubular cross beam 34 having yoke portions 35 affixed to its opposite ends. The front wheels 23 are dirigibly mounted on these yoke portions 35 by means of spindles 36, upon which the wheels 23 are rotatably journaled in a known manner. The spindles are dirigibly mounted in the yokes 35 by kingpins 37.

The cross beam 34 is supported for a limited vertical movement and pivotal movement by means of a connecting assembly, indicated generally by the reference numeral 38 and which appears best in FIGS. 3 and 4. This assembly includes a pair of brackets 39 which are welded at axially spaced locations to the frame tube portion 29 and which extend in embracing relationship to the beam 34.

The beam 34 has affixed to it a tubular assembly, indicated generally by the reference numeral 41 which is comprised of a inner tube 42 and outer tube 43 that are held in spaced relationship by respective bushing members 44. End caps 45 are interposed between the ends of the bushings 44 and inner and outer tubes 42 and 43 so as to provide a sealed relationship.

A pivot bolt 46 extends through the brackets 39 with a slight clearance relative to the inner tube 42. This clearance is maintained by an elastic cushioning element 47 which is loaded between a first U-shape bracket 48 that is fixed to the tubular assembly 41 and a second bracket 49 that is affixed to the underside of the frame tube portion 29. It should be readily apparent that this cushioning mounting assembly 38 controls vertical movement of the cross beam 34 relative to the frame assembly 22 and also permits pivotal movement about the axis defined by the pivot bolt 46 so as to permit one of the front wheels 23 to move vertically relative to the other wheel. As a result of this, road shocks will be isolated from the rider and the ride cushioned without excessive flexibility. Because of the central connection to the frame tube 22 its torsional deflection will also act to dampen road loads from the rider.

The degree of cushioning can be controlled by changing the length of the elastic element 47, its width and its damping characteristics.

As has been previously noted, the control assembly 27 is constructed so as to facilitate steering of the front wheels 23. This steering system will be described by primary reference to FIGS. 1–3 and includes the mounting of the front wheels 23 for their steering movement by the kingpins 37 and yokes 35 as aforenoted.

The handlebar assembly 28 is affixed to a steering shaft 51 which is, in turn, journaled for steering movement in a steering column 52. The steering column 52 is suitably affixed at its lower end to the forward part of the forward frame portion 29. A steering arm 53 is fixed to the lower end of the steering shaft 52. This steering arm 53 is connected by means of tie rods or tie links 54 to steering arms 55 that are affixed to the spindles 26 so as to steer the front wheels 23 in a well known manner.

The handlebar assembly 28 also includes a brake control lever 56 at one end thereof and a throttle control lever 57 at the other end thereof. The brake control lever 56 is connected by means of a wire actuator 58 to a brake actuating mechanism of any known type which operates frictional brakes associated with either or both of the front wheels 23 and the rear wheels 24. This type of control is well known and further description is not believed to be necessary to permit those skilled in the art to practice the invention.

The throttle control 57 is connected to a potentiometer or includes a potentiometer which controls the electrical current supplied to the propulsion system, as will be hereinafter described, so as to control the speed of the vehicle.

The suspension system 25 for the rear wheels 24 will now be described by particular reference to FIGS. 1, 2 and 5 with the construction being shown in most detail in FIG. 5.

This suspension system includes a trailing arm assembly, indicated generally by the reference numeral 59, which is pivotally supported at its front end on the frame assembly 22 where the front and rear portions 29 and 32 merge. A pivot suspension arrangement 61 is provided for this purpose.

The trailing arm assembly 59 includes a pair of side arm members 62 each of which has a trunion portion 63 formed at its forward end. These arm members 62 are connected to each other by means of a pivot bolt 64 and interposed spacer 65. The bolt 64 is held axially in place by a nut 60. In addition, cross tubes 66 and 67 are interconnected between intermediate portions and rear portions, respectively of the side arm members 62. Thus, the trailing arm 59 has a very robust construction.

Figure 5:
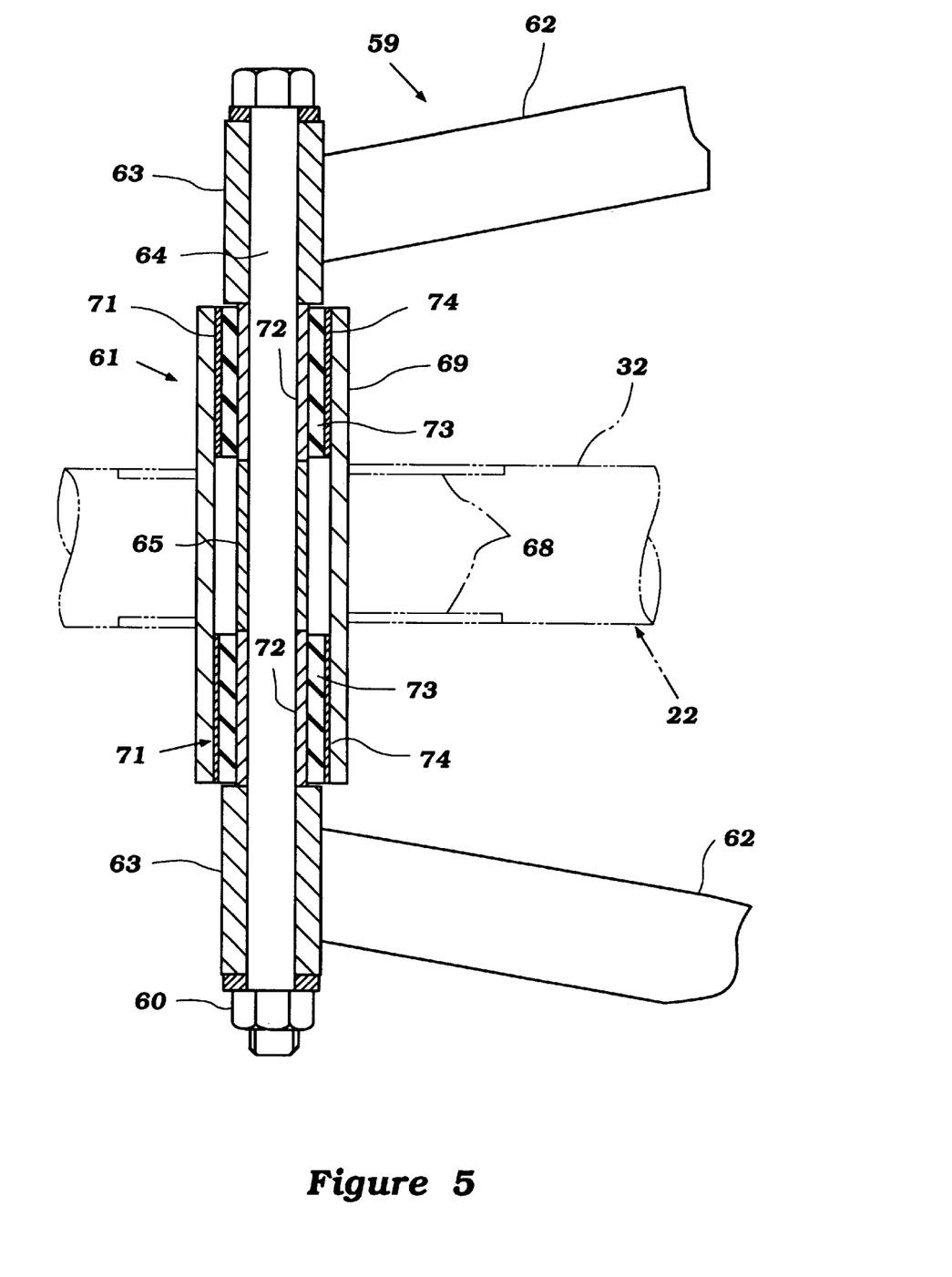
FIG. 5 is a top plan view showing the pivot joint for the rear suspension system, with portions broken away and shown in section and with portions of the frame tube showing in phantom so as to more clearly illustrate the construction.

Referring primarily to FIG. 5, although some of the construction also appears in FIGS. 1 and 2, a pair of supporting brackets 68 are welded to the sides of the frame tube 22 at the juncture between the portions 29 and 32 and extend downwardly. These brackets 68 are affixed to a tubular member 69 which extends transversely across the frame 22 but in close proximity to it. A pair of elastic sleeves 71 are interposed between the trailing arm pivot bolt 64 and the tube 69 for providing damping for vertical and twisting movement and also permit pivotal movement.

Each elastic sleeve 71 is comprised of an inner tube 72 formed from metal and which are abuttingly engaged with the spacer 65. An elastomeric cylindrical member 73 is affixed, as by vulcanizing to the inner sleeve 72 and to an outer sleeve 74 which is engaged with the inner portion of the tube 69. As a result of this construction, the trailing arm 59 may pivot about a transversely extending pivot axis for rear suspension movement of the rear wheels 23.

A single, centrally disposed tubular shock absorber and spring element, indicated generally by the reference numeral 75 and shown in FIG. 1 is loaded between a bracket 76 mounted to the trailing arm cross member 67 and a trunion member 77 fixed to the underside of the rearward part of the frame portion 32. Hence, the suspension system is quite compact and yet the damping is very effective. Because of the forward location of the pivot joint 61 a large suspension travel is possible. The narrow width of the pivot connection 61, however, does not interfere with the ability to enter the seat 26, as will be described in more detail later.

Each of the trailing arm side part 62 carries a pillow block 78 at its rear end which carries the end portions of axle tubes 79. These axle tubes 79 extend outwardly from a differential 81 for driving axle shafts to which the axle wheels 24 are affixed. These axle shafts appear in FIG. 1 and are identified by the reference numeral 82.

An electric motor, indicated by the reference numeral 83 is mounted on a mounting plate 84 carried between the rear ends of the arms 62 and drives the differential 81 through a suitable transmission mechanism. As has been previously noted, the throttle control lever 57 controls the amount of electrical current supplied to the motor 83 and, accordingly, the driving power for the rear wheels 24.

The seat assembly 26 is mounted in proximity to the suspension element mounting block 77 by means of threaded fasteners 85 which cooperate with a mounting plate to which a seat post 86 is affixed. The seat post 86 carries a seat cushion portion 87 on a pair of L-shape frame members 88. A back rest 89 is carried at the upper end of these seat frame members 88 so that a rider may sit on the seat cushion portion 87 with his back in contact with the back rest 89.

A pair of arm rests 91 are carried at the forward ends of a U-shape arm rest tube 92 which is journaled on the seat frame members 88 for movement from a normal riding position as shown in the solid line view FIG. 1 and in FIG. 2. This arm rest may be swung upwardly to the position shown in phantom line view of FIG. 1 so that a rider, can conveniently move into the open area between the front and rear wheels 23 and 24 at one side of the frame 22 and lower himself onto the seat 87.

Having thus positioned himself, the rider may place his feet on a pair of foot rest assemblies 90 carried at the forward portion of the frame assembly 22 in the area between the front wheels 23. These foot rests 90 are, in the illustrated embodiment, comprised of generally oval shape outer frame members 93 having a plurality of longitudinally extended rib portions 94. This will provide adequate foot support and will, at the same time, provide a relatively lightweight.

Thus, it should be apparent that the seating arrangement and the use of the very narrow frame permits the rider to easily move very close to the seat portion 87 while still standing. The seat portion 87 may be adjusted upwardly or downwardly along the frame tube portion 32 so that the fasteners 85 may cooperate with appropriate tapped openings in a mounting plate so as to permit not only length but height adjustment. Once seated, the rider may move his feet to the foot rest 90 so as to assume a comfortable riding position.

It should be noted that the rear wheels 24 have a narrower tread than the front wheels 23. This permits the vehicle 21 to be turned more sharply without the likelihood of encountering objects with the rear wheels 24. In addition, the relatively wide track and suspension system provides good stability. This is all done without sacrificing from the operator's ability to enter the seating area 26 by standing quite close to it and then just lowering his body onto the seat portion 87.

A pair of battery cases, each indicated generally by the reference numeral 95 are mounted on the opposite sides of the frame portion 32. These battery cases 95 are formed from an outer shell made up of a suitable high strength, lightweight material such as a molded fiberglass reinforced resin or the like and have male electrical fittings 96 formed on their lower forward ends.

These battery cases 95 are inclined at an angle to the horizontal and, as may be best seen in FIG. 1, thus, permit battery packs, indicated generally by the reference numeral 97 to be easily slid into them and removed from them without necessitating movement of the seat assembly 26. Also, because of the generally horizontal inclination of the battery cases 95, it is possible to easily remove and install them without lifting and without the operator or user having to bend over significantly.

Each battery pack 97 includes an outer housing 98 in which a plurality of individual cells are contained. These cells are in circuit with each other and with a connector 99 which cooperates with the male fittings 96 of the battery cases 95 when the battery pack 97 is put in place to establish an electrical connection. This connection connects the batteries with the accelerator control 57 and the electric motor 83 through a suitable control circuit.

The battery pack 97 has a fordable handle 101 which assist in removal and insertion of the battery pack 97 into the battery case 95.

The battery case 95 has a pivoted closure 102 that will swing to an open position as shown in phantom lines when a lock 103 is released so as to permit removal and insertion of the battery pack 97.

The electrical circuit is such that the vehicle 21 may be operated with either one or two batteries. In this way, when only one battery pack 97 is employed, the other battery case 95 may serve as a lockable container for personal items. A suitable cap may be provided to cover the male fitting 96 when this is done.

The battery pack 97 has a recharging connection 104 on one side thereof. Thus, the user may remove the battery packs 97 and move them to a remote location where they can be charged through connecting the charger to the charging connection 104.

The battery cases 95 are also provided with charging openings 105 that may be closed by a suitable cover. When opened, the battery packs 97 may also be charged in place through the charging opening 105 of the battery case 95.

For further transporting personal articles or other materials, a carrier 106 is provided at the front of the vehicle 21 and is supported on the steering column 52.

Figure 6:
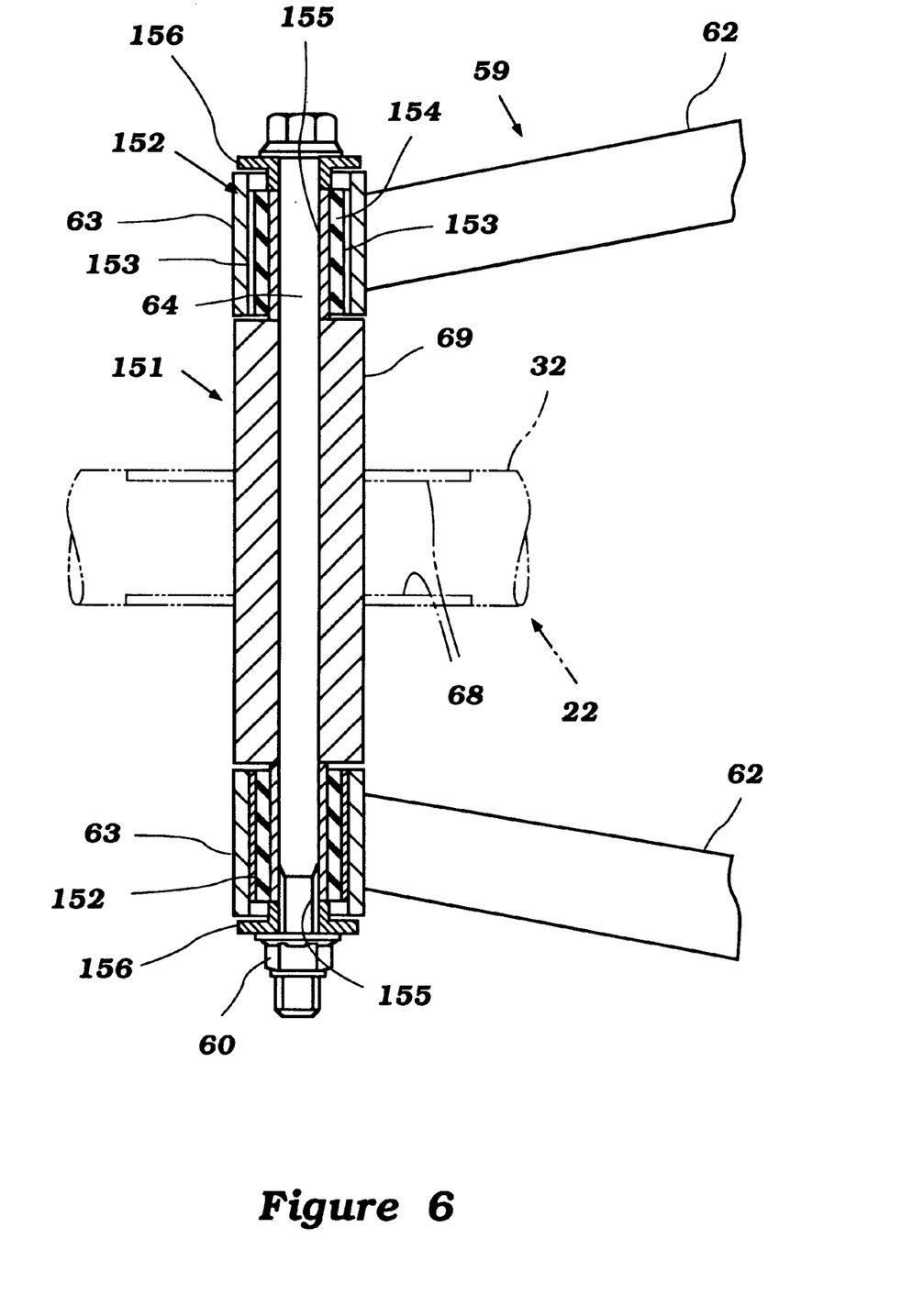
FIG. 6 is a view, in part similar to FIG. 5 and shows another embodiment of the invention.

FIG. 6 is a view in part similar to FIG. 5 but shows a different form for pivotal support of the rear wheel trailing arm 59. This support is indicated generally by the reference numeral 151 and the construction of the trailing arm 59 and the frame and its attachment to the attachment tube 69 is the same as that previously described. Thus, where components of this embodiment are the same as the previously described embodiment that have been identified by the reference numerals and will not be described again, except insofar as is necessary to understand the construction and operation of this embodiment.

In this embodiment, an elastic joint, indicated generally by the reference numeral 152 is interposed at each end of the trailing arm member 62 and interposed between their trunion portion 63 and the pivot bolt 64 which passes through the tubular member 69 and is held in place by the nut 60.

Each elastic member 152 is comprised of an outer sleeve 153 that is bonded or vulcanized to an elastomeric sleeve 154. The elastomeric sleeve 154 is, in turn, vulcanized to an inner ring 155 which is in encircling relationship with the pivot bolt 64. A pair of sealing washers 156 are interposed between the head of the bolt 64 and the nut 60 and the bushings 63 of the arms 62 for sealing purposes.

A small vehicle constructed in accordance with a third embodiment of the invention as shown in FIGS. 7–12 and is identified generally by the reference numeral 201. The vehicle 201 is substantially the same, except as will be hereinafter noted, as the embodiment of FIGS. 1–4 and can utilize a rear wheel suspension for the trailing arm assembly 59 of the type shown in either FIGS. 5 or 6. Because of these similarities, components of the vehicle 201 which are the same or substantially the same as the previously described embodiment have been identified by the same reference numerals. These common components will be described again only insofar as is necessary to understand there corroboration with the added or changed components of this embodiment.

Figure 7:
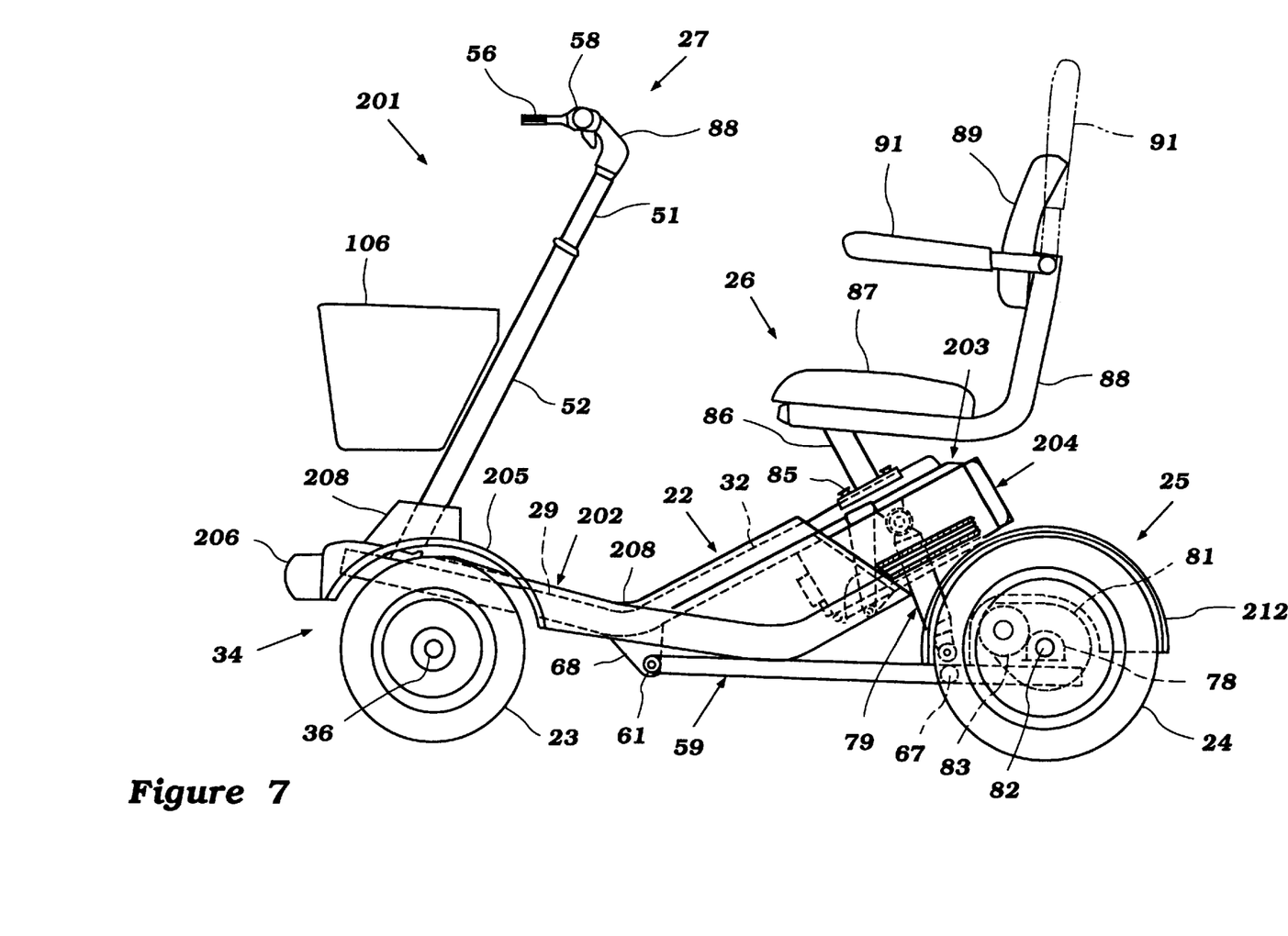
FIG. 7 is a side elevational view, in part similar to FIG. 1, and shows a third embodiment of the invention.
Figure 8:
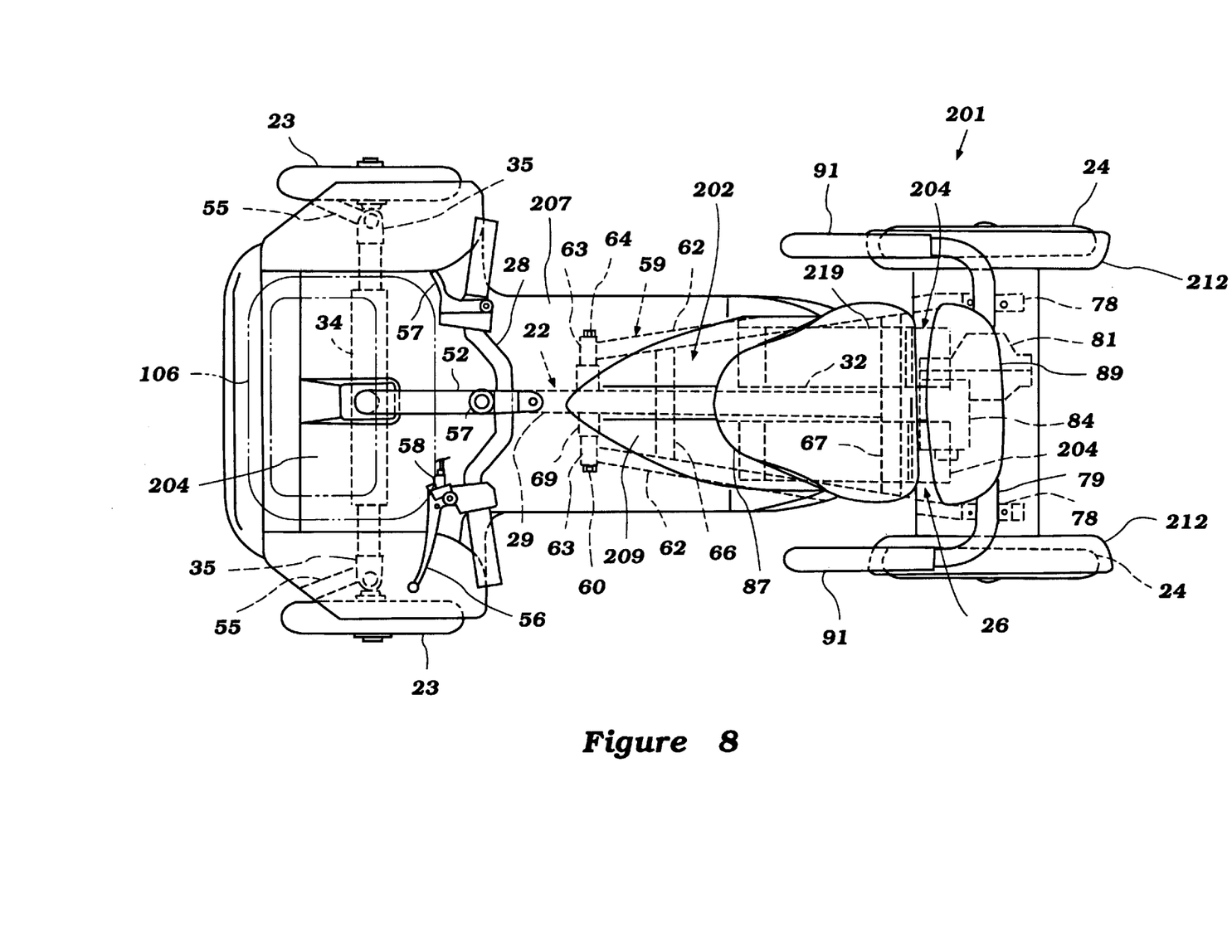
FIG. 8 is a top plan view, in part similar to FIG. 2, but for this embodiment.

The two basic changes from the previous embodiments are that the frame 22 is covered by a body member, indicated generally by the reference numeral 202. In addition, the battery carrier, indicated generally by the reference numeral 203 is generally open and hence, the battery pack, indicated generally by the reference numeral 204, of slightly different configuration is used.

In this embodiment, the body 202 is formed from any suitable lightweight, sheet-type high strength material such as either a metal stamping or a molded fiberglass reinforced resinous plastic material. The body portion 202 is comprised of a front area 204 which provides a foot rest for the seated rider. Outside of the foot rest area, there is provided a pair of raised portions 205 which extend in part over the front wheels 223 and thus, form fenders therefore. A hollow bumper portion 206 which may be formed from the same or a different material and which may have a rubberized coating is formed at the front of the body 202.

Figure 9:
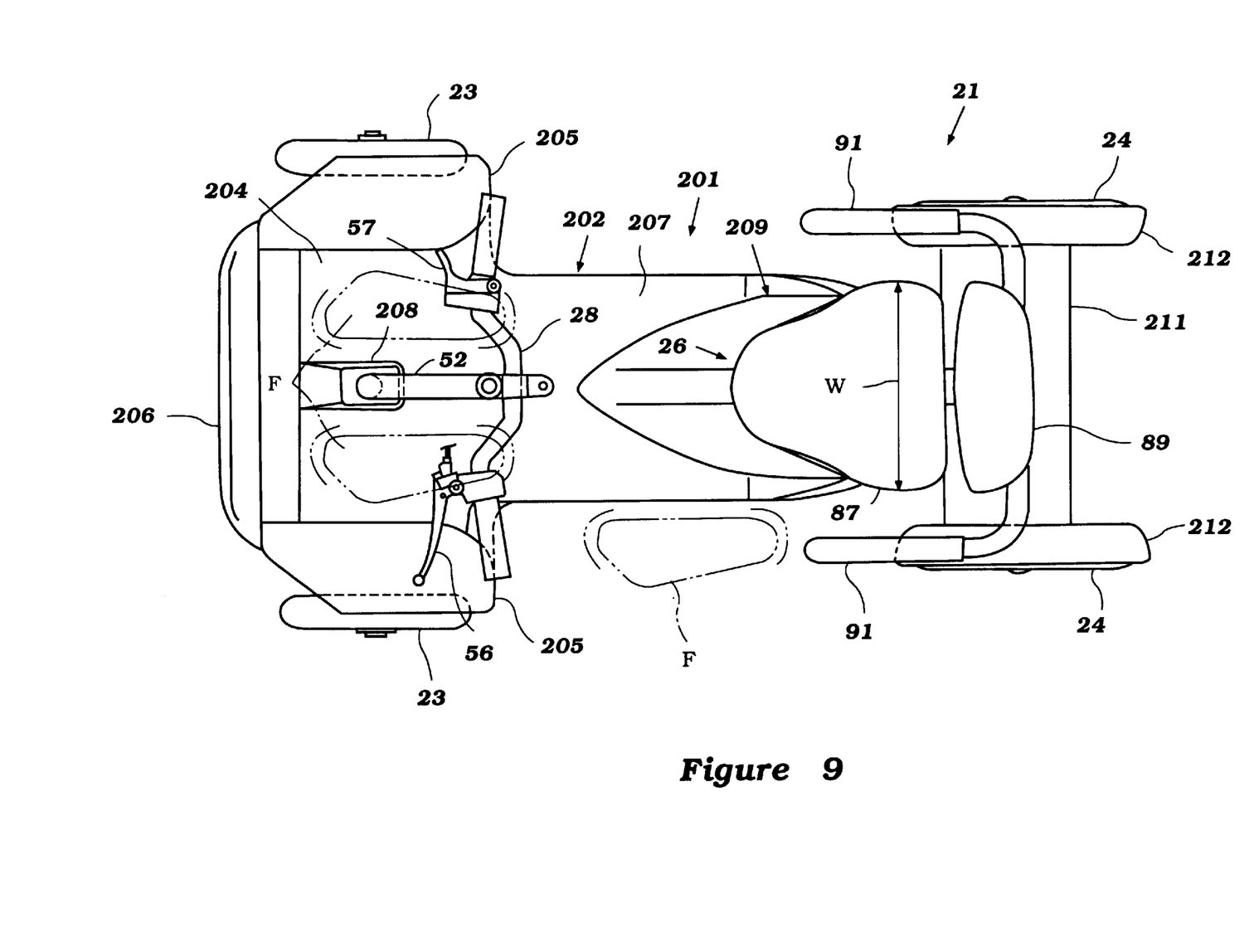
FIG. 9 is a top plan view, in part similar to FIG. 8 and shows how the rider's feet can be positioned in both the entry mode and when in riding position.

Although the front body part has fenders 205 that overlie the wheels 23, in the rearward direction, the body 202 has a much narrower section 207 which still affords room for a rider to place his feet as seen by the area F so that he can easily sit on the seat 87 and place his feet well inwardly of the front wheels 23 and even inwardly of the narrower treaded rear wheels 24. The area of the body portion 207 is not any wider than the width W of the seat 87 so as to facilitate this assumption of the seated position wherein the rider may place his feet on the foot areas F provided by the body section 204.

The front body portion between the foot areas 204 is provided with a raised mast area 208 that encircles the lower portion of the steering column 52.

The center portion of the central body part 207 is formed with a raised area 209 which generally encloses the upstanding frame portion 32 but still terminates short of the seat post 86 so as to permit the adjustment of the position of the seat 26 as previously noted.

Figure 10:
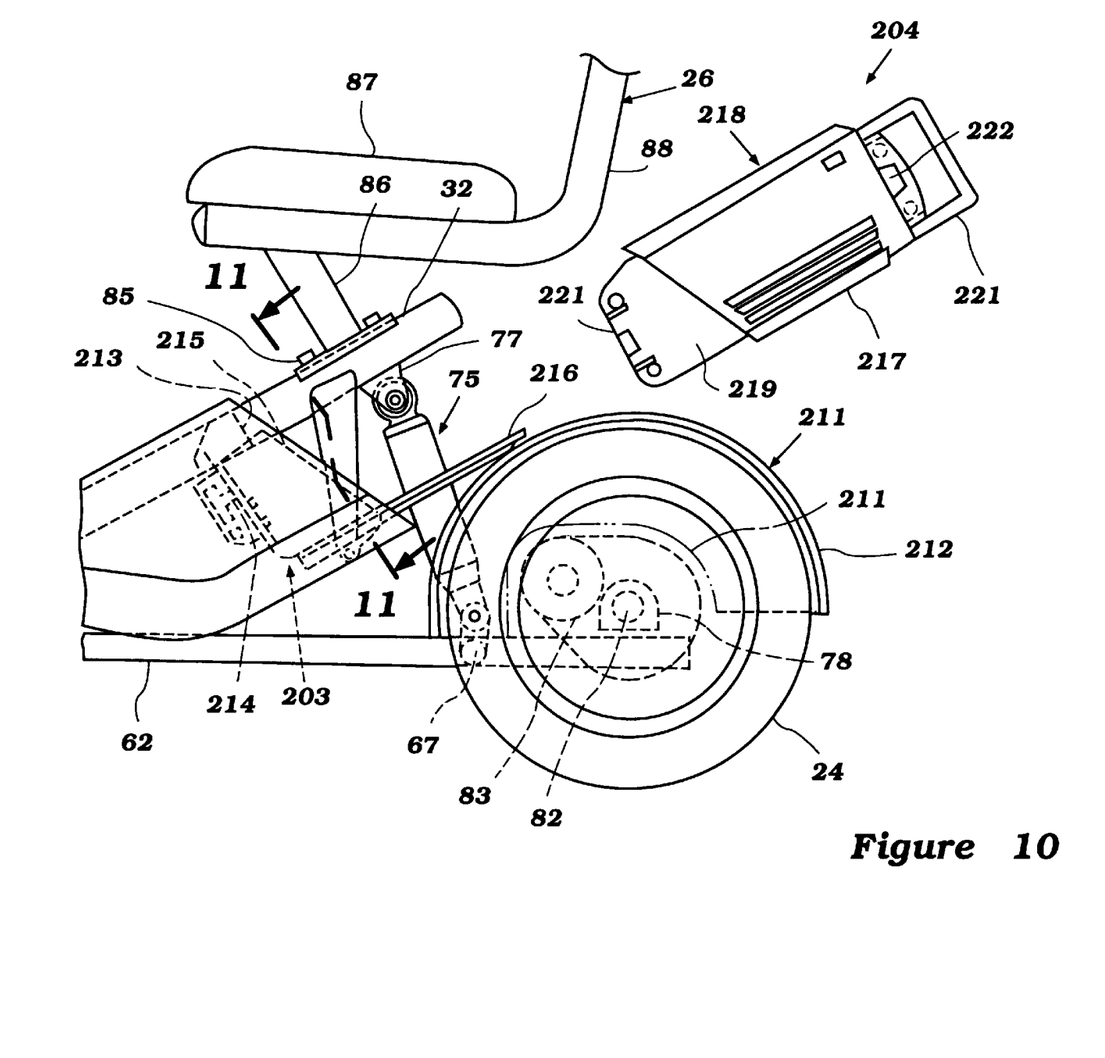
FIG. 10 is an enlarged side elevational view of the rear portion of the vehicle, looking in the same direction as FIG. 7 and showing how the batteries can be removed and inserted in this embodiment.

Also, this raised portion 209 provides a partial covering for the battery packs 204 as may be best seen in FIGS. 7 and 10.

To the rear, a separate body part 211 covers the electric motor 83, differential 81 and rear axle assembly 82. This part 211 has outer portions 212 which function as fenders for the rear wheels 24.

Figure 11:
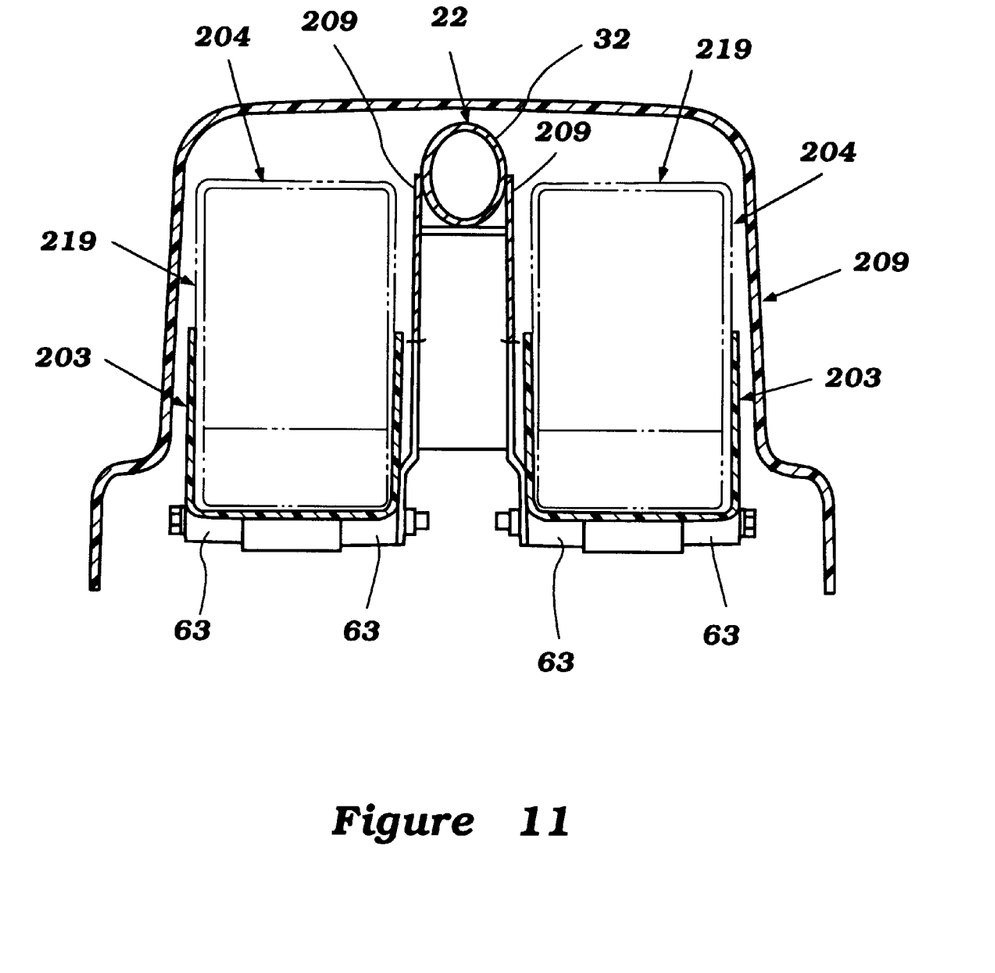
FIG. 11 is a cross sectional view of the battery mounting arrangement for this embodiment taken along the line 11—11 of FIG. 10.

Referring now to the battery box 203, in this embodiment the construction is more of an open nature. Therefore, the battery box is formed with a bottom portion 213 that forms a shell-like opening and which carries the male electrical terminal 214 in its lower face. This shell opening is terminated by a beveled rearward edge 215 from which a lower guide plate 216 extends.

This guide plate 216 cooperates with a pair of flanges 217 (FIG. 12) formed on the lower side of a shell portion 218 which encircles the battery pack 204. This forms a gap 219 so as to guide the battery pack 204 when it is slid into position in the shell battery cases 203.

Figure 12:
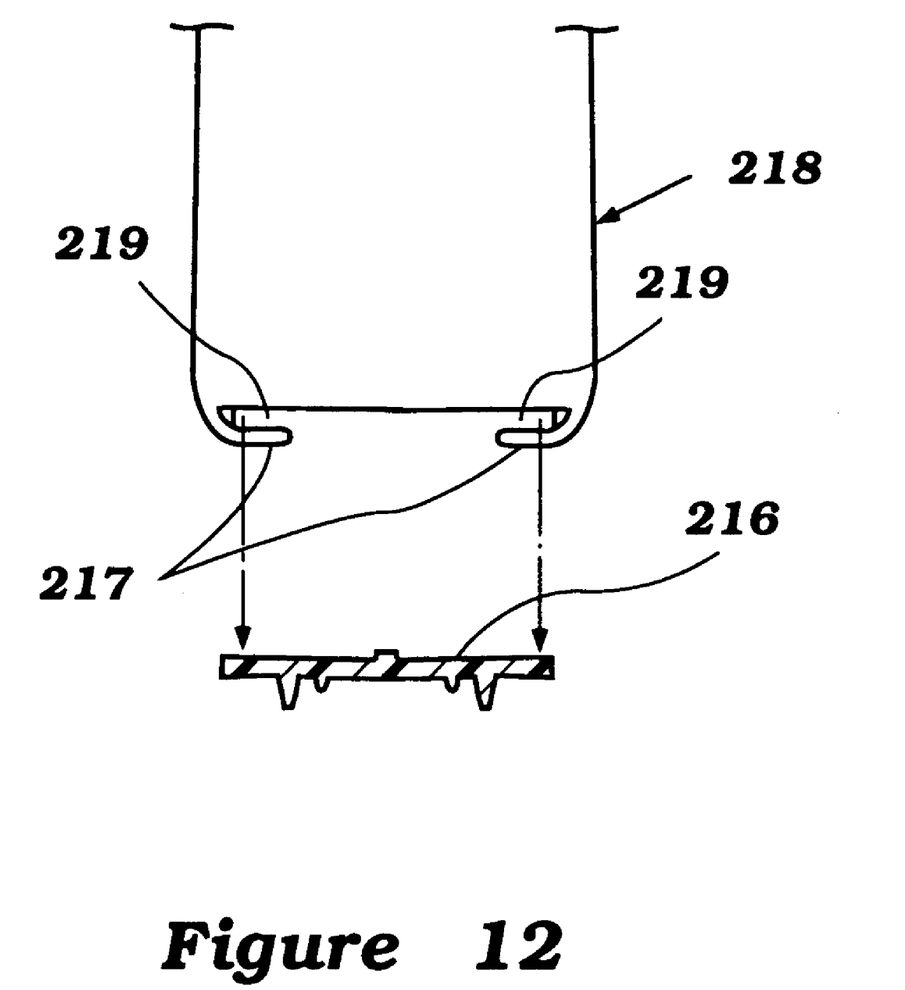
FIG. 12 is an enlarged view looking in the same direction as FIG. 11 and shows how the battery and battery carrier interact so as to retain the battery in position.

The main battery assemblage is covered by a lightweight shell 219 which, in turn, carries the female connector 221 that cooperates with the mail connector 214 when the battery pack 204 is inserted into the battery case 203.

Again, a recharging terminal 222 is formed on the battery case 219 and this can be easily accessible when the battery is installed because of the open nature of the construction.

Also, a carrying handle 223 is provided for assisting the operator in inserting and removing the battery packs 204.

Of course, the foregoing description is that preferred embodiments of the invention and various changes and modifications may be made without departing from the spirit and scope of the invention, as defined by the appended claims.

I claim:

1. A small, four-wheel vehicle comprised of a body frame assembly, a pair of front wheels, a first suspension system for suspending said front wheels from a forward portion of said body frame assembly with said front wheels being spaced transversely outwardly beyond said forward portion of said body frame assembly, a pair of rear wheels, a second suspension system for suspending said rear wheels from a rearward portion of said body frame assembly with said rear wheels being spaced transversely outwardly beyond said body frame assembly, said body frame assembly forward portion extending generally horizontally rearwardly from a forward termination extending forwardly of said front wheels and terminating at an intermediate portion disposed rearwardly of said front wheels, said body frame assembly rearward portion extending rearwardly and upwardly from said intermediate portion in a longitudinal direction toward said rear wheels and terminating at a point that does not extend rearwardly beyond the rearward peripheral edges of said rear wheels, and a seat carried by said rearward frame portion, the portion of said body frame assembly extending rearwardly from the trailing ends of said front wheels to said seat being not substantially wider than said seat so that a rider standing to the side of said body frame assembly may lower himself onto said seat to assume a seating posture on said vehicle without having to step onto said body frame assembly.

2. A small, four-wheel vehicle as set forth in claim 1, wherein the body frame assembly includes a frame comprised substantially solely of a single tubular member.

3. A small, four-wheel vehicle as set forth in claim 2, wherein the singular tubular member extends longitudinally along the center line of the vehicle and the single tubular member comprises the horizontally extending forward portion and the upwardly inclined rearward portion.

4. A small, four-wheel vehicle as set forth in claim 3, wherein the frame tubular member comprises substantially the entirety of the body frame assembly.

5. A small, four-wheel vehicle as set forth in claim 3, further including a sheet-type body covering at least partially the frame tubular member.

6. A small, four-wheel vehicle as set forth in claim 5, wherein the sheet type body extends from the area between the front wheels rearwardly and overlies only a portion of the frame tubular member in the area adjacent the rear wheels.

7. A small, four-wheel vehicle as set forth in claim 6, wherein a front portion of the sheet type body provides a foot area on which a rider seated on the seat may place his feet.

8. A small, four-wheel vehicle as set forth in claim 7, wherein the portion of the sheet type body between the front and rear wheels is no wider than the width of the seat.

9. A small, four-wheel vehicle as set forth in claim 8, wherein the sheet-type body provides at least in part fenders extending over at least portions of some the wheels.

10. A small, four-wheel vehicle as set forth in claim 1, wherein the seat is sized to accommodate only a single rider.

11. A small, four-wheel vehicle as set forth in claim 10, wherein the body frame assembly includes a frame comprised substantially solely of a single tubular member.

12. A small, four-wheel vehicle as set forth in claim 11, wherein the singular tubular member extends longitudinally along the center line of the vehicle and the single tubular member comprises the horizontally extending forward portion and the upwardly inclined rearward portion.

13. A small, four-wheel vehicle as set forth in claim 12, wherein the frame tubular member comprises substantially the entirety of the body frame assembly.

14. A small, four-wheel vehicle as set forth in claim 13, wherein the front wheels are dirigibly supported by the first suspension system for steering of said vehicle and the tread distance between the front wheels is substantially greater than the tread between the rear wheels for assisting in maneuvering.

15. A small, four-wheel vehicle as set forth in claim 12, further including a sheet-type body covering at least partially the frame tubular member.

16. A small, four-wheel vehicle as set forth in claim 15, wherein the sheet type body extends from the area between the front wheels rearwardly and overlies only a portion of the frame tubular member in the area adjacent the rear wheels.

17. A small, four-wheel vehicle as set forth in claim 16, wherein a front portion of the sheet type body provides a foot area on which a rider seated on the seat may place his feet.

18. A small, four-wheel vehicle as set forth in claim 17, wherein the portion of the sheet type body between the front and rear wheels is no wider than the width of the seat.

19. A small, four-wheel vehicle as set forth in claim 18, wherein the sheet-type body provides at least in part fenders extending over at least portions of some the wheels.

20. A small, four-wheel vehicle as set forth in claim 19, wherein the tread distance between the front wheels is substantially greater than the tread between the rear wheels for assisting in maneuvering.

21. A small, four-wheel vehicle as set forth in claim 1, wherein the front wheels are dirigibly supported by the first suspension system for steering of said vehicle and the tread distance between the front wheels is substantially greater than the tread between the rear wheels for assisting in maneuvering.

22. A small, four-wheel vehicle as set forth in claim 21, wherein one of the suspension system comprises a beam rotatably journaling the respective wheels at its outer ends and having a pivotal central support on the body frame assembly.

23. A small, four-wheel vehicle as set forth in claim 22, wherein the pivotal central support of the beam includes damping means for controlling the movement of the beam relative to the body frame assembly.

24. A small, four-wheel vehicle as set forth in claim 23, wherein the damping means comprises an elastomeric element.

25. A small, four-wheel vehicle as set forth in claim 24, wherein the damping means also dampens vertical movement of the beam relative to the body as well as pivotal movement.

26. A small, four-wheel vehicle as set forth in claim 25, wherein beam supports the front wheels and wherein the front wheels are dirigibly supported at the respective ends of the beam.

27. A small, four-wheel vehicle as set forth in claim 1, wherein one of the suspension system comprises a beam rotatably journaling the respective wheels at its outer ends and having a pivotal central support on the body frame assembly.

28. A small, four-wheel vehicle as set forth in claim 27, wherein the pivotal central support of the beam includes damping means for controlling the movement of the beam relative to the body frame assembly.

29. A small, four-wheel vehicle as set forth in claim 28, wherein the damping means comprises an elastomeric element.

30. A small, four-wheel vehicle as set forth in claim 29, wherein the damping means also dampens vertical movement of the beam relative to the body as well as pivotal movement.

31. A small, four-wheel vehicle as set forth in claim 30, wherein beam supports the front wheels and wherein the front wheels are dirigibly supported at the respective ends of the beam.

32. A small, four-wheel vehicle as set forth in claim 1, wherein one of the suspension systems comprises an arm pivotally supported at one on the body frame and carrying the respective wheels at its other end.

33. A small, four-wheel vehicle as set forth in claim 32, wherein the pivotal supports of the arm to the frame is disposed in the area between the front and rear wheels.

34. A small, four-wheel vehicle as set forth in claim 33, wherein the arm has an A-type configuration being narrower at the end pivotally supported on the frame and wider at the end carrying the respective wheels.

35. A small, four-wheel vehicle as set forth in claim 34, wherein the rear wheels are carried by the arm.

36. A small, four-wheel vehicle as set forth in claim 35, wherein the body frame assembly includes a frame comprised substantially solely of a single tubular member.

37. A small, four-wheel vehicle as set forth in claim 36, wherein the singular tubular member extends longitudinally along the center line of the vehicle and the single tubular member comprises the horizontally extending forward portion and the upwardly inclined rearward portion.

38. A small, four-wheel vehicle as set forth in claim 37, wherein the frame tubular member comprises substantially the entirety of the body frame assembly.

39. A small, four-wheel vehicle as set forth in claim 35, further including a sheet-type body covering at least partially the frame tubular member.

40. A small, four-wheel vehicle as set forth in claim 39, wherein the sheet type body extends from the area between the front wheels rearwardly and overlies only a portion of the frame tubular member in the area adjacent the rear wheels.

41. A small, four-wheel vehicle as set forth in claim 40, wherein a front portion of the sheet type body provides a foot area on which a rider seated on the seat may place his feet.

42. A small, four-wheel vehicle as set forth in claim 41, wherein the portion of the sheet type body between the front and rear wheels is no wider than the width of the seat.

43. A small, four-wheel vehicle as set forth in claim 1, further including an electric motor supported by the body frame assembly for driving the rear wheels and a battery case carried by the upwardly extending rearward portion of the body frame assembly and extending generally parallel thereto for insertion of a battery assembly into and out of said battery case in a generally horizontal direction.

44. A small, four-wheel vehicle as set forth in claim 43, wherein there are provided a pair of battery cases on opposite sides of the body frame assembly.

45. A small, four-wheel vehicle as set forth in claim 44, wherein an battery cases are fully enclosed and include a selectively openable closure for closing the outer end thereof.

46. A small, four-wheel vehicle as set forth in claim 45, further including locking means for locking the closure.

47. A small, four-wheel vehicle as set forth in claim 46, wherein at least one of the battery cases can store personal objects if a battery is not inserted therein.

48. A small, four-wheel vehicle as set forth in claim 44, wherein the battery cases comprise shells having sockets for receiving the respective battery and guide members for cooperating with the batteries for guiding its movement in the generally horizontal direction for insertion and removal.

49. A small, four-wheel vehicle as set forth in claim 44, wherein the body frame assembly includes a frame comprised substantially solely of a single tubular member, the battery cases being mounted on opposite sides thereof.

50. A small, four-wheel vehicle as set forth in claim 49, wherein the singular tubular member extends longitudinally along the center line of the vehicle and the single tubular member comprises the horizontally extending forward portion and the upwardly inclined rearward portion upon which the battery cases are mounted.

51. A small, four-wheel vehicle as set forth in claim 50, wherein the frame tubular member comprises substantially the entirety of the body frame assembly.

52. A small, four-wheel vehicle as set forth in claim 50, further including a sheet-type body covering at least partially the frame tubular member.

53. A small, four-wheel vehicle as set forth in claim 52, wherein the sheet type body extends from the area between the front wheels rearwardly and overlies only a portion of the frame tubular member in the area adjacent the rear wheels.

54. A small, four-wheel vehicle as set forth in claim 53, wherein the front portion of the sheet type body provides a foot area on which a rider seated on the seat may place his feet.

55. A small, four-wheel vehicle as set forth in claim 54, wherein the portion of the sheet type body between the front and rear wheels is no wider than the width of the seat.

56. A small, four-wheel vehicle as set forth in claim 55, wherein the sheet-type body provides at least in part fenders extending over at least portions of some the wheels.

57. A small, four-wheel vehicle as set forth in claim 1 wherein the seat comprises a cushion portion, a backrest portion and an arm rest portion that is pivotal from a horizontally extending position in which a rider may rest his arms and a vertical boarding position on the sides of said backrest portion so that the rider may sit on the cushion portion without interference.

* * * * *